United States Patent [19]
Pellet et al.

[11] Patent Number: 5,316,656
[45] Date of Patent: May 31, 1994

[54] HYDROCARBON CONVERSION PROCESSES WITH MOLECULAR SIEVE AGGLOMERATES HAVING IMPROVED TRANSPORT PROPERTIES

[75] Inventors: Regis J. Pellet, Croton-On-Hudson; Frank P. Gortsema, Pleasantville, both of N.Y.

[73] Assignee: UOP, Des Plaines, Ill.

[21] Appl. No.: 702,487

[22] Filed: May 20, 1991

Related U.S. Application Data

[63] Continuation-in-part of Ser. No. 519,972, May 7, 1990, Pat. No. 5,168,082.

[51] Int. Cl.⁵ .................. C10G 45/64; C10G 11/05
[52] U.S. Cl. ............................ 208/120; 208/111
[58] Field of Search ............................. 208/111, 120

[56] References Cited

U.S. PATENT DOCUMENTS

| | | | |
|---|---|---|---|
| 4,036,739 | 7/1977 | Ward | 208/120 |
| 4,168,084 | 12/1992 | Pellet | 502/9 |
| 4,743,354 | 5/1988 | Ward | 208/111 |
| 4,752,378 | 6/1988 | Valyocsik | 208/111 |
| 4,784,747 | 11/1988 | Shihabi | 208/111 |
| 4,859,311 | 8/1989 | Miller | 208/84 |
| 5,139,648 | 8/1992 | Lambert | 208/111 |

*Primary Examiner*—Helane Myers
*Attorney, Agent, or Firm*—Thomas K. McBride; Eugene I. Snyder

[57] ABSTRACT

Molecular sieve agglomerates exhibiting reduced pore mouth blockage and decreased diffusivity resistance to the internal sieve pores result from coating, prior to addition of a binding agent to the sieve, the molecular sieve particles with an organic polymer, fixing the polymer to the sieve surface so that it exhibits no migratory tendencies and subsequently removing the coating by combustion during calcination of the formed agglomerate. Such agglomerates showed enhanced activity and selectivity in typical refining processes such as dewaxing and fluid catalytic cracking. The molecular sieve agglomerates also may be employed in other hydrocarbon conversion processes such as hydrocracking, dehydrocyclization, isomerization, hydrofining, reforming, and dealkylation.

5 Claims, 5 Drawing Sheets

HYDROCARBON CONVERSION PROCESSES WITH MOLECULAR SIEVE AGGLOMERATES HAVING IMPROVED TRANSPORT PROPERTIES

CROSS REFERENCE TO RELATED APPLICATION

This application is a continuation-in-part of copending application Ser. No. 519,972, filed May 7, 1990, now U.S. Pat. No. 5,168,082 all of which is hereby incorporated by reference.

BACKGROUND OF THE INVENTION

This application relates to agglomerates of fine particles of molecular sieve material. For the purpose of this application, "agglomerates" are formed catalyst or adsorbent such as extrudates, pills, tablets, beads, spheres, and so on. More particularly, this application relates to agglomeration of individual particles of molecular sieves where the individual particles are held together by binding agents, especially where at least the major component of the binding agent is an inorganic oxide such as alumina or silica. The invention within provides a solution to the problem of pore blockage of molecular sieves by the aforesaid binding agents.

The remarkable properties of molecular sieves have been successfully utilized for several decades. For most industrial applications the discrete particles of molecular sieve materials are too small to be used directly, hence are agglomerated into larger particles which may be more efficaciously used as, for example, adsorbents, catalysts, and so forth. These agglomerates are formed by mixing small particles of molecular sieves with a binding agent (binder) where alumina and silica are examples of commonly used binders. The agglomerates consist of a multiplicity of small particles dispersed in a binder and often containing adjuncts, such as plasticizers, burnout agents, and extrusion agents, for example.

Molecular sieves are characterized by an internal pore structure which is responsible for their ability to perform size and shape separations and which also serves as a microreactor of molecular size. For optimum separation properties it is apparent that access to these pores needs to be unimpeded. In many cases optimum catalytic properties also require unimpeded access to these pores. Ingress to and egress from the pores are certainly a necessary prerequisite for reactions to occur in the pores; there can be no catalytic activity arising from the pore structure as a reaction zone when the reactant has no access to the reaction zone, and there will be no measurable reaction unless the product can leave the reaction zone so as to permit access to further reactant molecules. In the context of catalytic properties, the reaction rate and selectivity (where more than one reaction may occur) will be influenced by the transport of reactant into and product out of the reaction zone within the pores of a molecular sieve.

It should be clear from the foregoing that the transport properties of resulting molecular sieve agglomerates are a major concern when binding small particles of molecular sieves. Unfortunately, commonly used binders tend to reduce pore access to varying degrees by blocking the mouth of pores, and such pore blockage may significantly adversely affect adsorbent and/or catalytic activity of the resulting agglomerate by impeding the transport of substances between the pore interior and the external medium.

We have found a means of reducing pore mouth blockage while not adversely affecting the binding of small particles by coating the latter with certain organic polymers prior to the binding stage. Molecular sieves have been coated with organic polymers previously but for the distinctly different purpose of reducing attrition. For example, the patentee in U.S. Pat. No. 4,319,928 faced the problem of the disintegration of zeolitic adsorbents upon their continued use in aqueous streams with attendant silicon contamination of the product stream. The patentee solved this problem by coating the agglomerates with cellulose esters. It may be mentioned in passing that the patentee coated the dispersion of the molecular sieves in the binder, i.e., what the patentee coated was previously used as the finished bound adsorbent whereas in the invention to be described it is the individual particles of the molecular sieve which are coated prior to forming agglomerates with the binder. The scope of protective coatings for zeolites was reviewed by the patentees of 4,822,492 who substituted latexes for inorganic oxides as a binder for crystalline molecular sieves in order to alleviate problems of deterioration of zeolitic agglomerates through attrition when used in an aqueous medium. The patentees believed their protective coating minimized additional pore blockage of molecular sieves.

Since coating molecular sieves previously has been recognized to contribute to pore blockage, it is paradoxical that we have alleviated pore blockage in our invention by deliberately coating small particles of molecular sieve. However, we coat molecular sieves for a different purpose, at a different stage of product manufacture, and with different materials than are used in the prior art. Conceptually, the method of our invention coats the surface of a molecular sieve via a multiplicity of mechanisms. When the coated molecular sieve particles are mixed with a binder and subsequently agglomerated, the coating prevents (or more properly, reduces) the interaction between the binder and molecular sieve surface which causes pore blockage, although the coating itself at this stage results in substantial additional pore blockage. After the agglomerate is formed the surface coating is then removed by calcination leaving voids immediately around the molecular sieve particle. The resulting formed agglomerates have substantially less pore blockage than agglomerates formed without the interim coating, and since air calcination effectively removes the organic coating there remains no vestige of a "foreign" material which might influence the properties of the molecular sieve. This procedure and the resulting material is portrayed, albeit somewhat fancifully, in FIG. 1.

SUMMARY OF THE INVENTION

The purpose of this invention is to improve diffusivity at the molecular sieve-binder interface in agglomerates and to reduce molecular sieve pore mouth blockage during the binding process. An embodiment comprises coating small particles of molecular sieve with organic polymers, mixing the fine coated molecular sieve particles with a binder to form agglomerates, and thereafter removing the organic coating by heating the agglomerates so as to volatilize the coating or to combust it with the formation of volatile materials. In one embodiment the molecular sieve has a positively charged surface and the organic coating is an anionic polymer or oligomer. In a more specific embodiment the oligomer is a salt of a polyacrylic acid. In another embodiment the surface of the molecular sieve is negatively charged and the coating arises from a cationic polymer or oligomer. Other embodiments will be apparent from the ensuing description.

DESCRIPTION OF THE INVENTION

Figure 1:
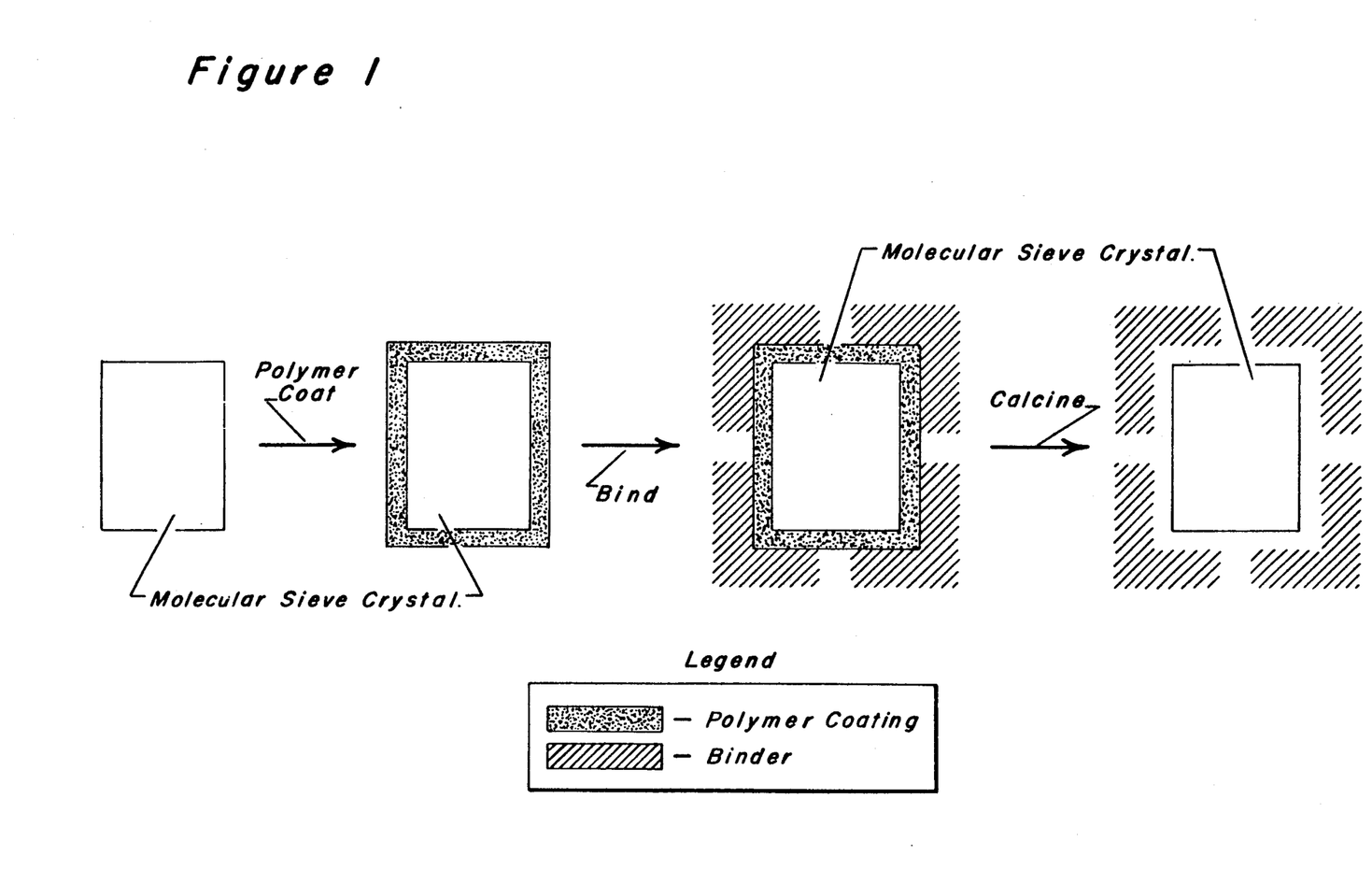
FIG. 1 is a pictorial representation of the coating process and a particle within the agglomerate as formed by the process of this invention.

The invention within provides a means of reducing pore mouth blockage and improving diffusivity at the molecular sieve-binder interface in agglomerates formed by binding small particles of molecular sieves with inorganic oxides, especially silica and alumina. The invention is perhaps most readily understood by reference to FIG. 1. A small particle of a molecular sieve is coated with an organic polymer or oligomer to afford a molecular sieve particle which is encased in the shell of organic material. It needs to be stated that the representation of the figure is an exaggeration; it is not that every molecular sieve particle is encased within an organic shell, and it is better to think of the small particles of molecular sieve having a multiplicity of patches of organic coating on its surface. What this coating does is to prevent interaction between the surface of the molecular sieve particle and the binders which are added to agglomerate the various small particles of molecular sieve into a larger, industrially more desirable particle such as an extrudate, sphere, bead, pill or tablet. After formation of the agglomerate induced by the inorganic binder, the material is calcined not only to set the inorganic binder but also to volatilize or otherwise remove the organic coating around the individual molecular sieve particles. The result, which is the right-most representation in FIG. 1, is a molecular sieve which has a substantial portion of its surface unattached to the binder. Since the entrance to the internal pores of the molecular sieve are at the surface of the molecular sieve particles, this results in decreased pore mouth blockage and increased diffusivity at the molecular sieve-binder interface.

Prior to the detailed description of our invention, an overview seems desirable. A key aspect of the present invention is the coating of molecular sieve particles, especially prior to binding, then removing the coating subsequent to binding and forming. The net effect of this process is the production of void spaces following the forming step at the molecular sieve-binder interface by combustion and volatilization of the coating agent, resulting in enhanced diffusion across that interface.

Although the use of burnout agents to increase porosity in bound systems is not new, both the manner of their use as disclosed within and the consequences of our particular manner of use are previously unknown. Burnout agents typically are added to the molecular sieve-binder mixture prior to extrusion or forming and are combusted during the calcination step to volatile products to leave void spaces at the locations the burnout agents originally occupied, which are randomly distributed throughout the molecular sieve-binder composite. That is, the prior art production of voids is at non-specific locations, and the prior art contains no realization of the added benefits which flow by specifically designing those void spaces at the molecular sieve-binder interface. In stark contrast to the prior art, the burnout agent of this invention, which is a polymer coating agent, is specifically directed and attached to the molecular sieve, especially prior to binding, to ensure that the void spaces created upon combustion will be at the molecular sieve-binder interface. A key aspect of the current invention is that the coating agent is chosen so that it will remain fixed to the molecular sieve surface during subsequent treatments encountered during the binding and forming steps. In general, a polymer is impregnated onto the molecular sieve surface from an appropriate solution. During this impregnation and subsequent drying, the initially soluble polymeric coating agent is rendered insoluble at least under the conditions of the steps of binding, forming, and setting, by one of several mechanisms. The actual mode by which this insolubilization or fixation is achieved is not as important as the requirement that the polymer must not migrate through the binder in subsequent processing steps; once attached to the molecular sieve the polymer must remain fixed, i.e., firmly attached to the molecular sieve surface, through the subsequent steps until volatilized during combustion. Coatings manifesting such properties will be subsequently referred to as nonmigratory coatings.

From the foregoing it should be clear that "fixing" in this application means firmly attaching an organic polymer to the surface of a molecular sieve. A few mechanisms of fixation can be described here for the purpose of illustrating the foregoing but these examples in no way limit the overall scope of the invention. In one method of fixing the polymer to the molecular sieve surface, a water insoluble polymer dissolved in an organic solvent is contacted with the molecular sieve powder. The solvent is then evaporated, leaving the polymer deposited on the surface of the molecular sieve crystals since the polymer is too large to enter the molecular sieve pore structure. All subsequent steps of binding and forming are performed in an aqueous environment in which the polymer is insoluble and where the polymer on the sieve surface is left undisturbed. In a final step the polymer is combusted leaving a void at the surface of the molecular sieve.

In another method of fixing the polymer coating agent to the surface of the molecular sieve crystal a polymer is selected with a water solubility that changes with pH. Thus, a polycarboxylic acid is soluble in water at high pH where it is predominantly in the dissociated or anionic carboxylate form. For example, after coating a molecular sieve with ammonium polycarboxylate in aqueous solution at a pH greater than 8 where it is soluble, the solvent can be evaporated and subsequent processing can be conducted in an aqueous environment but at lower pH as is commonly done with acid peptized binders. At such lower pH the polymer will remain in the water insoluble carboxylic acid form and adhere to the molecular sieve surface during the binding steps.

In yet another illustration an ionic polymer can be selected for attachment to a sieve with a charged surface. Thus, a sieve with a positively charged surface could be contacted with a solution containing a polymeric anion such as the polycarboxylate described above. In this example the charge difference between the crystal and the polymer causes the polymer to become securely attached to the crystal surface due to coulombic attractions. Alternatively, a sieve with a negatively charged surface might be effectively coated with a polymeric cation.

In summary, the method by which the polymer is fixed to the sieve surface is not critical. The more critical aspect is that the polymer, however fixed to the sieve surface, must remain so fixed throughout the subsequent binding and forming steps to be removed only in the final calcination step. This will ensure that the porosity created by the combustion of the polymer is associated with the molecular sieve-binder interface and that diffusion restriction due to excessive interaction of the binder with the sieve is reduced resulting in enhanced access by reactants and egress by products. The desirable result of this enhanced diffusivity will be increased activity for the primary reactions and increased selectivity for the desired primary products.

The molecular sieves which may be used in the practice of this invention may be any crystalline inorganic molecular sieve such as aluminosilicates, aluminophosphates, silicaluminophosphates, borosilicates, silicates, and silicalite. Representative of such molecular sieves are the aluminophosphates of U.S. Pat. No. 4,310,440, the silicaluminophosphates of U.S. Pat. No. 4,440,871, transition metal-containing silicaaluminophosphates (MeAPSO's), zeolite X, zeolite Y, LZ-210, zeolite A, zeolite F, zeolite L, zeolite P, zeolite Q, zeolite W, clinoptilolite, mordenite, chabazite, errionite, ZSM-type zeolites, NU-type zeolites, faujasite, phillipsite, and so forth. It is to be clearly understood that the foregoing is not an exhaustive list of molecular sieves which can be used in the practice of this invention, but the members are merely illustrative and representative of this class of materials.

Typically the molecular sieve particles are less than about 20 microns in diameter, and the small size often precludes their direct use in commercial processes. For example, when used as a packed bed such a small particle size would lead to far larger pressure drops than could be economically accommodated. Consequently the small particles are dispersed in an inorganic matrix acting as a binder which forms agglomerates consisting of a multitude of small particles of molecular sieves. The molecular sieve typically will be present in the inorganic matrix in such portions that the resulting product contains from 1 to 95 weight percent of the molecular sieve, although more normally the agglomerate contains between about 10 and about 90 weight percent of molecular sieve in the final product. The binders which are of interest in this invention are inorganic oxides such as silicas, silica-aluminas, aluminas, titania, silica-zirconia, silica-magnesia, alumina-boria, alumina-titania, clays such as kaolin, and mixtures thereof. The usual purpose of the binder is to aid in forming or agglomerating the small particles of the molecular sieve into larger, commercially more useful ones. The mixture of molecular sieves and binder is then formed into particles of suitable size and shape and subsequently calcined to "set" the particles. It should be mentioned that the inorganic oxides when used as binders also may contain other materials as additives, such as plasticizers, extrusion acids, and burnout agents.

The agglomeration of small particles results from a strong interaction between the surface of the molecular sieve particles and the binder. Such strong interactions not only lead to agglomeration of the particles but also lead to pore mouth blockage. The remainder of this discussion will be directed toward the means discovered to improve diffusivity at the molecular sieve-binder interface and to reduce the pore mouth blockage which arises during the binding and forming processes.

Our solution to pore mouth blockage which arises during the binding and forming stages of agglomerate production is to coat the individual small particles of molecular sieves with organic material which will physically adhere to the molecular sieve rather than migrate through the binder. This coating acts as a protective layer for the surface and itself covers many of the pore entrances at the sieve surface. But in doing so such a coating also prevents interaction of the binder with the molecular sieve surface at the entry to the pore channels. After binding and forming of the agglomerates the coating is then removed, and in doing so the pore entrances previously covered by the coating are opened and become more freely accessible to species such as reactants.

The materials desired for use as a molecular sieve surface coating are organic oligomers or polymers which are initially soluble in some suitable solvent for ease of application, which either become water insoluble upon coating the sieve surface or can be so insolubilized, and which can be completely removed after agglomerate formation, preferably via calcination. For the purposes of this application no distinction will be made between an "oligomer" and a "polymer"; the practical distinction between the two rests on their molecular weight and the line separating oligomers and polymers often is quite indistinct. For the purposes of this application the phrase "polymer" will include both organic oligomers and polymers which can be used in the practice of this invention.

The surfaces of molecular sieve particles often are charged. As a consequence one broad class of organic polymers which is quite useful in the practice of our invention is the class of charged polymers, that is, either cationic or anionic polymers. Where a solution of a polymer with a charge type opposite to that found on the molecular sieve surface is used, the organic polymer will adhere very strongly to the surface of the molecular sieve through electrostatic interactions, that is, the organic polymer will become insolubilized at the molecular sieve surface, remaining there when the coated sieve is subsequently bound with an inorganic oxide rather than migrating through the binder. Because most molecular sieve surfaces are positively charged, anionic polymers are particularly preferred in the practice of this invention. Examples of such polymers include the polymeric carboxylic acids and polymeric sulfonic acids generally and their water soluble salts. Exemplary of the aforegoing classes are poly(acrylic acid), poly(crotonic acid), poly(maleic acid), poly(methacrylic acid), poly(itaconic acid), copolymers of maleic anhydride with olefins (such as butadiene, sytrene, acrylates, and vinyl ethers) which have been hydrolyzed to the carboxylic acids, poly(styrenesulfonic acid), poly(vinylsulfonic acid), and poly(acrylamidomethylpropanesulfonic acid), but the aforegoing is illustrative only and not intended to be exhaustive.

Where the molecular sieve surfaces are negatively charged, which is a less frequent situation, cationic organic polymers may be successfully used. Such polymers encompass for the most part polymeric quaternary ammonium ion species, especially the trialkylammonium salts of polymeric amines. Illustrative of the latter are poly(vinylbenzylamine), α-aminopolystyrene, ring-aminated polystyrene, poly(allylamine), poly(ethyleneimine), and poly(vinylamine). The aforegoing are only exemplary and not exhaustive.

Since it is only necessary that the organic polymer which is used as the coating be initially soluble and become insolubilized at the surface of the molecular sieve particle prior to subsequent binding, any polymer which has these properties and which does not migrate through the binder is suitable in our invention. Insolubilization often implies a strong surface attraction between the molecular sieve and the polymer, which may arise from van der Waal's forces, charge attraction, covalent bonding, or some combination of the above. In appropriate cases it may be desirable to modify the surface charge of the molecular sieve in order to coat it with an anionic or cationic organic polymer. In those situations where the sieve exterior surface bears a negative charge or no charge at all and where it is desirable to coat the sieve with an anionic polymer, such as a polycarboxylate, it is necessary to first treat the sieve surface with cationic species to develop the appropriate electrostatic attraction between the polymer and the sieve surface. For example, silicalite, a silica molecular sieve isostructural with MFI (pentasil structure) has very little surface cation content. Attempts to coat silicalite with a polycarboxylic acid were unsuccessful unless the silicalite was first treated with a poly(aluminumhydroxy) cation such as aluminumchlorohydrate (ACH; aluminumchlorohydrol; aluminumchlorohydroxide). When silicalite is first impregnated with an ACH slurry, dried, and contacted with an aqueous solution of a polyacrylate, the polymer coating procedure described within is successful. Because it is important that the coating remain at the molecular sieve surface and not migrate through the binder it also is important that there should not be a strong attraction between the coating and the binder. Until the coating is removed at a later stage in agglomerate formation, it is highly desirable that it be strongly associated only with the molecular sieve surface.

The amount of organic polymeric coating which must be used to effectively utilize the favorable consequences of reduced pore mouth blockage varies with the intended use of the agglomerate, and the optimum needs to be determined on a case-by-case basis. In general, the coating may be from about 0.1 to about 5 weight percent of the molecular sieve, although a range from about 0.5 to about 3 weight percent is more often suitable.

After the small particles are coated as described above, they are agglomerated using the binding and forming procedures well known to those in the art. Agglomeration consists of adding a binder, often containing other materials such as plasticizers, so as to form agglomerates of a multiplicity of smaller particles. After the addition of binder and formation of large particles the agglomerate is generally calcined to set the binder. It is during this stage of agglomerate production that the molecular sieve surface coating is removed, either by direct volatilization or by volatilization via combustion. Thus, calcination generally is conducted at temperatures between about 300° and about 700° C. and may be conducted in the presence of air or oxygen, wherever necessary, to induce volatilization of the organic coating. Removal of the organic coating then presents fresh surfaces of molecular sieve particles which are not associated with the binder used in agglomerate formation and thus makes freely available pore entrances unimpeded by particles of the binder.

The prior description of our preparation of molecular sieve agglomerates with improved transport properties is one where the organic polymer coating is deposited on the surface of the molecular sieve prior to mixing with a binding agent. Although this is the most preferred variant of our invention it is not the only procedure possible. In particular, we have found that often it is not necessary for the zeolite to be coated prior to binding and that coating may be effected during the binding procedure. Evidently, particularly with a charged polymer to be used as a coating, there is sufficient attraction between the organic polymer and the molecular sieve surface that the polymer migrates preferentially to the sieve's surface even in the presence of a binder so that a slurry of the molecular sieve, binder, organic polymer, and so on may be formed and spray dried to afford a molecular sieve agglomerate with improved transport properties.

Molecular sieves have been used as catalysts or as catalyst supports in a large number of processes, especially those of interest to the petrochemical industry, including reforming, hydrocracking, dewaxing, isomerization, fluid catalytic cracking (FCC), partial oxidation, alkylation and disproportionation of aromatics. Specific reaction conditions and the types of feeds which can be used in these processes are set forth in U.S. Pat. Nos. 4,310,440 and 4,440,871, which are incorporated by reference. The molecular sieve agglomeratess of this invention also may present advantages when used as adsorbents in separation processes since diffusion of materials into and out of the pores should be greatly facilitated and size selectivity should be determined more strictly by pore size rather than availability of pore entrances.

The present molecular sieve agglomerates having improved transport properties also exhibit surface selectivity characteristics which render them useful as catalyst or catalyst bases in a number of hydrocarbon conversion and oxidative combustion reactions. They can be impregnated or otherwise loaded with catalytically active metals by methods well known in the art and used, for example, in fabricating catalyst compositions having silica or alumina bases. Of the general class, those species having pores larger than about 4 Å are preferred for catalytic applications.

Among the hydrocarbon conversion reactions catalyzed by molecular sieve agglomerates having improved transport properties are cracking, hydrocracking, alkylation for both the aromatic and isoparaffin types, isomerization including xylene isomerization, polymerization, reforming, hydrogenation, dehydrogenation, transalkylation, dealkylation, hydrodecyclization and dehydrocyclization.

Using molecular sieve agglomerates having improved transport properties which contain a hydrogenation promoter which is usually at least one member from Group VIII metals, especially platinum or palladium, heavy petroleum residual stocks, cyclic stocks and other hydrocrackable charge stocks can be hydrocracked at temperatures in the range of 400° F. to 825°

F. (204° C. to 441° C.) using molar ratios of hydrogen to hydrocarbon in the range of between 2 and 80, pressures between 10 and 3500 psig. (69 to 24133 kPa), and a liquid hourly space velocity (LHSV) of from 0.1 to 20, preferably 1.0 to 10.

The molecular sieve agglomerates having improved transport properties employed in hydrocracking are also suitable for use in reforming processes in which the hydrocarbon feedstocks contact the catalyst at temperatures of from about 700° F. to 1000° F. (371° C. to 538° C.), hydrogen pressures of from 100 to 500 psig (690 to 3448 kPa), hydrocarbon molar ratios in the range of 1 to 20, preferably between 4 and 12.

These same catalysts, i.e., those containing hydrogenation promoters, are also useful in hydroisomerization processes in which feedstocks such as normal paraffins are converted to saturated branched chain isomers. Hydroisomerization is carried out at a temperature of from about 200° F. to 600° F. (93° C. to 316° C.), preferably 300° F. to 550° F. (149° C. to 288° C.) with an LHSV value of from about 0.2 to 1.0. Hydrogen is supplied to the reactor in admixture with the hydrocarbon feedstock in molar proportions (hydrogen to hydrocarbon) of between 1 and 5.

At somewhat higher temperatures, i.e., from about 650° F. to 1000° F. (343° C. to 538° C.), preferably 850° F. to 950° F. (454° C. to 510° C.) and usually at somewhat lower pressures within the range of about 15 to 50 psig (103 to 345 kPa), the same catalyst compositions are used to hydroisomerize normal paraffins. Preferably the paraffin feedstock comprises normal paraffins having a carbon number range of $C_7$-$C_{20}$. Contact time between the feedstock and the catalyst is generally relatively short to avoid undesirable side reactions such as olefin polymerization and paraffin cracking. LHSV values in the range of 0.1 to 10, preferably 1.0 to 6.0, are suitable.

Catalysts containing the molecular sieve agglomerates having improved transport properties find use in the conversion of alkylaromatic compounds, particularly the catalytic disproportionation of toluene, ethylene, trimethyl benzenes, tetramethyl benzenes and the like. In the disproportionation process, isomerization and transalkylation can also occur. Group VIII noble metal adjuvants alone or in conjunction with Group VI-B metals such as tungsten, molybdenum and chromium are preferably included in the catalyst composition in amounts of from about 3 to 15 weight percent of the overall composition. Extraneous hydrogen can, but need not, be present in the reaction zone which is maintained at a temperature of from about 400° to about 750° F. (204° C. to 399° C.), pressures in the range of 100 to 2000 psig (690 to 13790 kPa) and LHSV values in the range of 0.1 to 15.

Catalytic cracking processes are preferably carried out with molecular sieve agglomerates having improved transport properties using feedstocks such as gas oils, heavy naphthas, deasphalted crude oil residua, etc., with gasoline being the principal desired product. Temperature conditions of 850° to 1100° F. (454° C. to 593° C.), LHSV values of 0.5 to 10 and pressure conditions of from about 0 to 50 psig (0 to 345 kPa) are suitable.

Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalytic cracking. For these reactions it is preferred to use the molecular sieve agglomerates having improved transport properties in conjunction with a Group VII nonnoble metal cation such as titanium and nickel.

In catalytic dealkylation wherein it is desired to cleave paraffinic side chains from aromatic nuclei without substantially hydrogenating the ring structure, relatively high temperatures in the range of about 800°-1000° F. (427° C. to 538° C.) are employed at moderate hydrogen pressures of about 300-1000 psig (2069 to 6895 kPa), other conditions being similar to those described above for catalytic hydrocracking. Preferred catalysts are of the same type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Feedstocks include gasoline fractions, kerosenes, jet fuel fractions, diesel fractions, light and heavy gas oils, deasphalted crude oil residua and the like any of which may contain up to about 5 weight percent of sulfur and up to about 3 weight percent of nitrogen.

Similar conditions can be employed to effect hydrofining, i.e., denitrogenation and desulfurization, of hydrocarbon feeds containing substantial proportions of organonitrogen and organosulfur compounds. It is generally recognized that the presence of substantial amounts of such constituents markedly inhibits the activity of catalysts of hydrocracking. Consequently, it is necessary to operate at more extreme conditions when it is desired to obtain the same degree of hydrocracking conversion per pass on a relatively nitrogenous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks, in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volume percent of fresh feed per pass, might be the same as those preferred for hydrocracking another feedstock having a lower concentration of hydrocracking inhibiting constituents, e.g., organonitrogen compounds. Consequently, it has become the practice in this art to establish the conditions under which a certain feed is to be contacted on the basis of preliminary screening tests with the specific catalyst and feedstock.

Isomerization reactions are carried out under conditions similar to those described above for reforming, using somewhat more acidic catalysts. Olefins are preferably isomerized at temperatures of 500°-900° F. (260°-482° C.), while paraffins, naphthenes and alkyl aromatics are isomerized at temperatures of 700°-1000° F. (371°-538° C.). Particularly desirable isomerization reactions contemplated herein include the conversion of n-heptene and/or n-octane to isoheptanes, iso-octanes, butane to iso-butane, methylcyclopentane to cyclohexane, meta-xylene and/or ortho-xylene to paraxylene, 1-butene to 2-butene and/or isobutene, n-hexene to isohexene, cyclohexene to methylcyclopentene, etc. The preferred form of the catalyst is a combination of the molecular sieve agglomerates having improved transport properties with polyvalent metal compounds (such as sulfides) of metals of Group II-A, Group II-B and rare earth metals. For alkylation and dealkylation processes the molecular sieve agglomerates having improved transport properties and having pores of at least 5 Å are preferred. When employed for dealkylation of alkyl aromatics, the temperature is usually at least 350° F. (177° C.), and ranges up to a temperature at which substantial cracking of the feedstock or conversion products occurs, generally up to about 700° F. (371° C.). The temperature is preferably at least 450° F. (232° C.) and not greater than the critical temperature of the compound undergoing dealkylation. Pressure conditions are applied to retain at least the aromatic feed in the liquid state. For alkylation the temperature can be as low as 250° F. (121° C.) but is preferably at least 350° F. (177° C.). In the alkylation of benzene, toluene and xylene, the preferred alkylating agents are olefins such as ethylene and propylene.

The molecular sieve agglomerates of our invention also may be used in a process for catalytically dewaxing a hydrocarbon feedstock. Normally such feedstocks contain higher molecular weight straight chain paraffins and slightly branched paraffins which are waxes, causing high pour and cloud points in oils. Catalytic dewaxing selectively cracks these waxy paraffins to lower molecular weight products, and to some extent may isomerize the paraffins to non-waxy products. The hydrocarbon oil feedstocks normally have a boiling point at least about 350° F. (177° C.). Catalytic dewaxing is performed in the presence of hydrogen, at a total pressure as low as about 15 psig up to about 3000 psig (103 kPa up to about 20685 kPa), at temperatures between about 200° C. and 475° C., and at a liquid hourly space velocity of from 0.1 to about 20; cf. U.S. Pat. No. 4,859,311. The molecular sieves are used in conjunction with at least one Group VIII metal, such as platinum and palladium, often with adjuncts such as molybdenum, vanadium, zinc, nickel and so on.

The following examples illustrate some of the aspects of our invention. These examples are not intended to be exhaustive in any manner, but are merely representative of the preparation and use of the agglomerates of our invention.

EXAMPLE 1

Polymer coating for improved dewaxing catalyst performance. The following experiments demonstrate the use of depositing a polymer coating on SAPO-11, a medium pore silicoaluminophosphate molecular sieve, in the preparation of superior dewaxing catalysts.

Prior to catalyst preparation, the SAPO-11 sample (prepared according to U.S. Pat. No. 4,440,871) was calcined in air by ramping the sample from room temperature to 650° C. over a 2 hour period, holding it at 650° C. for 3 hours, then cooling it to room temperature for further processing. The calcined sample was palladium loaded by mixing a slurry of 69.1 g of SAPO-11 and 1.84 g of palladium nitrate dissolved in 630 cc of distilled water for one hour at room temperature. The mixture was then filtered and the collected solids were washed three times in 1 liter of water and dried overnight at 100° C. The SAPO-11 thus prepared had a palladium loading of 1%.

A total of 5.0 g of a 30% solution of poly(acrylic acid) oligomer dissolved in water (Joncryl 62, from Johnson Wax Co.) was further diluted with 54 g of distilled water and added to 59.8 g of the Pd loaded SAPO-11, and the resulting paste was mixed well to ensure that all SAPO-11 particles were wet with the acrylic coating agent. The paste was dried overnight at 110° C. To verify that the initially water soluble coating had been attached to the SAPO-11 surface and was no longer water soluble, a small portion of the coated SAPO-11 was added to an aliquot of water and the mixture was shaken vigorously for a few seconds. When the mixture became quiescent the coated SAPO-11 was observed to float on the surface of the water, indicating that the sieve had been successfully coated in that the water of the mixture was no longer able to penetrate the interior of the sieve crystal due either to pore blockage by the coating agent or due to the hydrophobic nature of the coating-SAPO-11 interface. As a control, when a small portion of untreated SAPO-11 was mixed with water the entire sample was observed to be wet and to sink to the bottom of the mixture.

The coated, palladium loaded SAPO-11 (56.4 g) was placed in a Hobart mixer with 35.28 g of a colloidal silica suspended in water (40% as $SiO_2$; Ludox AS-40 from E. I. DuPont de Nemours), that had been premixed with 7.0 cc of a 10% ammonium acetate solution to induce gelling, where the silica was to serve as a binder. The two components were carefully mixed and additional water was added to obtain an extrudable mixture. The resulting paste was extruded to form 1/16th inch extrudates, which were dried at 110° C. overnight and calcined at 500° C. for 3 hours. Calcination at this temperature effectively sets the silica binder and at the same time combusts the acrylic coating that had encapsulated the SAPO component during the binding step to produce voids around the SAPO crystal. Precoating decreases the binder-crystal interaction such that following calcination access to and egress from the crystal by reactants and products during catalytic use is significantly enhanced. This catalyst was prepared to contain 20% silica binder and 80% of 1% palladium on SAPO-11.

For comparative purposes an additional catalyst was prepared of identical composition except that the palladium loaded SAPO-11 component was not treated with the acrylic oligomer prior to silica binding. Both catalysts were evaluated for effectiveness in catalytic dewaxing and for their use in reducing the pour point of hydrocarbon feedstocks by contacting a feedstock with hydrogen at a total pressure of 2,000 psig at a liquid hourly space velocity of 1.0 and at a hydrogen flow rate of 10,000 SCFB (standard cubic feed per barrel) at temperatures between 720° and 800° F. (382° C. and 427° C.). The feedstock employed in the dewaxing was a vacuum gas oil having an initial boiling point of 400° F. (204° C.) and a final boiling point of 1110° F. (599° C.) (as determined by ASTM test method D-2887) and having a pour point of about 95° F. (35° C.).

The reactor effluents were collected and the fraction of the feed converted (on a weight basis) to products boiling below 500° F. (260° C.) were determined by simulated distillation (ASTM test method D-2887). The conversion is reported as the weight percent of the feedstock converted to products boiling below 500° F.

(260° C.). The pour points were determined by ASTM test method D-97-66 on the reactor effluents after maintaining the effluent at about 130° F. (54° C.) During its collection. The results are presented in the table below and in the attached figures.

TABLE 1

PERFORMANCE OF COMPARATIVE CATALYST

| Run Temperature | % Conversion | Product Pour Point (F) |
|---|---|---|
| 720 | 5.5 | 65 |
| 739 | 9.1 | 65 |
| 758 | 9.1 | 50 |
| 780 | 13.3 | 45 |
| 799 | 20.4 | 45 |
| 799 | 19.8 | 55 |

TABLE 2

PERFORMANCE OF PRECOATED CATALYST

| Run Temperature | % Conversion | Product Pour Point (F) |
|---|---|---|
| 720 | 5.1 | 45 |
| 739 | 6.7 | 25 |
| 759 | 9.5 | 25 |
| 778 | 13.8 | 0 |
| 799 | 21.6 | −10 |

Figure 2:
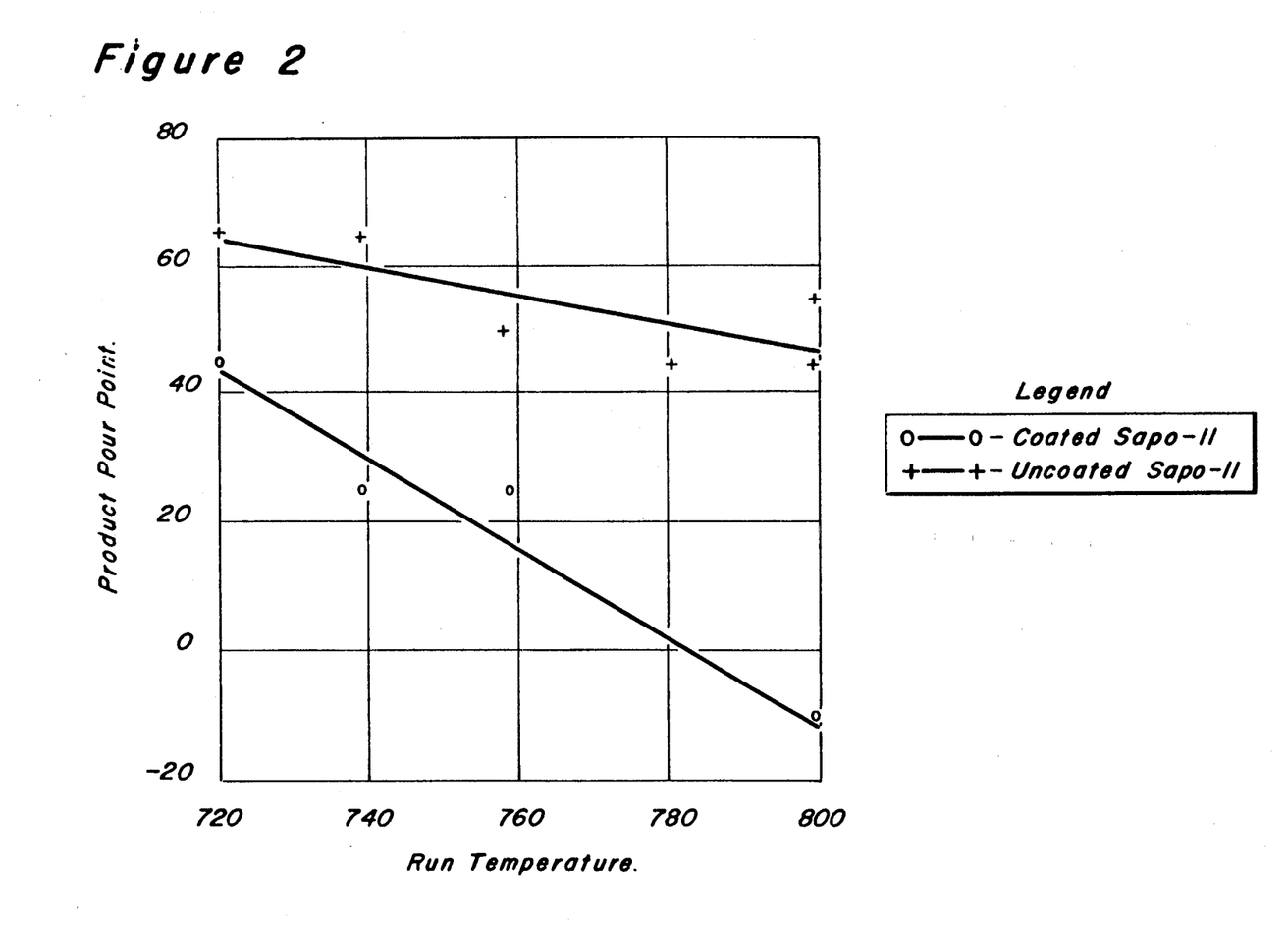
FIG. 2 compares the effect of the coated vs. non-coated molecular sieves of Example 1 on the pour point of a hydrocarbon feed in catalytic dewaxing at various temperatures.
Figure 3:
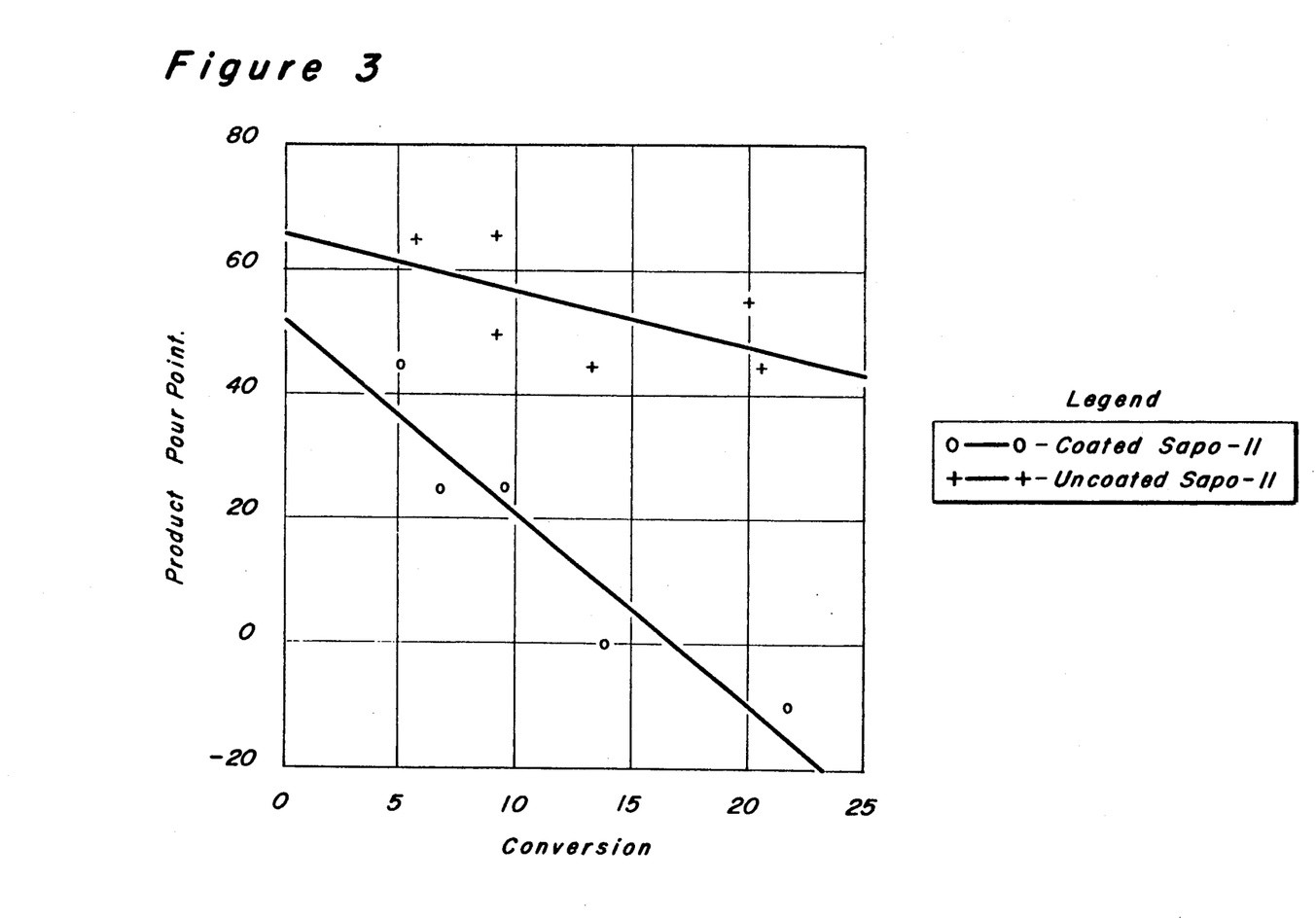
FIG. 3 shows the relation between pour point and conversion to products of boiling point under 500° F. in catalytic dewaxing using the coated and uncoated molecular sieve of Example 1.

The results in the tables and FIG. 2 show that at comparable run conditions and run temperatures the precoated catalyst is more effective at reducing the pour point of the feed than is the uncoated catalyst. It can be interpreted that with the coated catalyst large, waxy feed molecules have greater access to the active cracking sites within the SAPO-11 sieve more effectively and are converted to non-waxy products. The uncoated catalyst permits restricted access of the feed to the interior of the SAPO crystals due to pore mouth blockage by the binder and thus exhibits reduced activity. The tables and FIG. 3 show that when catalysts are compared at comparable conversion, the precoated catalyst has achieved a significantly lower pour point at any given level of conversion compared to the uncoated reference. Alternatively, it could be stated that the precoated catalyst reduced pour point with significantly lower conversion than the reference. It must be appreciated that conversion of the valuable feed oil is undesirable in most lube oil and distillate oil dewaxing operations. Thus, the catalyst that achieves reduced pour point properties with the lower yield loss will have a significant commercial and economic advantage to the refiner. The improved selectivity observed with the coated catalyst is still one additional aspect of improved access to and from the active SAPO crystal interior. The results can be interpreted that with the coated SAPO, isomerized and thus dewaxed feed can readily escape the crystal interior without further unneeded and undesirable reactions. In the case of the reference which lacks the additional porosity at the crystal exterior, egress of isomerized, dewaxed products is hindered and chances for additional cracking reactions are increased, thus increasing chance for yield loss as observed.

EXAMPLE 2

Polymer Coating for Improved FCC Performance. Because of the very short residence time encountered in typical FCC catalytic applications (generally only several seconds), it is necessary to contact the feed with the molecular sieve component of the FCC catalyst and disengage the desirable primary product from the molecular sieve component as rapidly as possible both to obtain maximum activity and also to reduce secondary cracking reactions which would result in lower yields. Polymer coating of the molecular sieve component of an FCC catalyst prior to binding and forming by spray drying resulted in catalysts with superior activity for cracking and superior selectivity for primary cracked products (higher yields of gasoline). The following paragraphs describe the preparation of several FCC catalysts containing varying amounts of an active molecular sieve component, which was a steam stabilized form of Y zeolite prepared as described in U.S. Pat. No. 4,036,739, which may be used in FCC catalysts. Catalysts also were prepared with varying amounts of coating agent (ranging from 0 to 5%).

Four reference catalysts were prepared to contain 15, 20, 25 and 30% steam stabilized Y zeolite on an anhydrous basis by blending 15, 20, 25 and 30 g of steam stabilized Y powder with 65, 60, 55 and 50 g of kaolin clay, respectively. Each blend was additionally mixed with 20 g of silica provided as a 40% aqueous silica sol (Ludox LS). Initially, the zeolite and clay components were intimately mixed in a Hobart blender (minimum 15 minutes). To this mixture was added the Ludox silica sol that had been previously gelled by the addition of sufficient 10% ammonium acetate solution to cause gelling. Additional water was added to the entire mixture with additional mixing until an extrudable consistency was obtained. The resulting paste was extruded to 1/16th extrudates which were dried at 100° C. overnight, then calcined at 500° C. for three hours. The calcined extrudates were sized to 60/100 mesh to obtain an appropriate size for microactivity testing (described below). In order to simulate the degradative hydrothermal environment experienced by FCC catalysts in commercial use, the foregoing catalysts were additionally subjected to steam treatment by placing in a horizontal tube furnace that was equilibrated at 790° C. in 100% steam. The catalysts were thus treated for 2 hours in steam.

In order to demonstrate the beneficial effect which is obtained when the molecular sieve component of the FCC catalyst is precoated with an organic polymer prior to binding step, additional catalysts were prepared in a fashion identical to that described above except that the molecular sieve component was precoated with an acrylic oligomer prior to catalyst formation as follows. A coating solution was prepared containing 2.5 weight percent of a poly(acrylic acid) oligomer (Joncryl 62, from Johnson Wax Co.) based on the weight of the steam stabilized Y powder to be coated and dissolved in sufficient water to ensure incipient wetness when the solution was added to the steam stabilized Y powder. This solution was added to the steam stabilized Y powder to form a well mixed paste so that all particles of the steam stabilized Y molecular sieve were wet with the oligomer-containing solution and the paste was air dried overnight at 100° C. The dried and coated steam stabilized Y powder containing 2.5% oligomer on an anhydrous basis was used to prepare four catalysts containing 15, 20, 25 and 30% coated zeolite as described above for the reference catalyst. The finished catalyst was then calcined so as to fix the binder and to remove the oligomer by combustion and thus create the desired porosity in the vicinity of the molecular sieve component within the bound catalyst. The calcined catalyst was next sized and pre-steamed at 790° C. for 2 hours as above prior to micro activity testing.

An additional four catalysts were prepared as above except that the steam stabilized Y zeolite powder was precoated with 5% Joncryl 62 acrylic oligomer prior to catalyst formation. The coating procedure was as described above. Four catalyst were prepared to contain 15, 20, 25 and 30% coated zeolite Catalysts were extruded, dried, calcined and sized as above, then steamed.

All steamed catalysts were evaluated for fluid catalytic cracking activity and selectivity using the micro activity test (MAT) as defined by the ASTM procedure D-3907, except that the catalysts were tested at 930° F. (499° C.) using a vacuum gas oil feed.

In the following examples, conversion is the weight percent conversion as defined in the ASTM test method D-3907. The "percent gasoline selectivity" is defined as those hydrocarbons in the product from $C_5$ hydrocarbons to hydrocarbons boiling below 420° F. (216° C.) expressed as weight percent on feed divided by percent conversion as defined above. The results of the evaluation are summarized in Table 3 and in FIGS. 4 and 5.

TABLE 3

| Catalyst Description | | | % Gasoline |
|---|---|---|---|
| % Coating | % Zeolite | % Conversion | Selectivity |
| 0 | 15 | 65.0 | 75.6 |
| 0 | 20 | 68.3 | 72.7 |
| 0 | 25 | 72.3 | 72.7 |
| 0 | 30 | 74.9 | 71.5 |
| 2.5 | 15 | 71.1 | 73.9 |
| 2.5 | 20 | 75.6 | 72.4 |
| 2.5 | 25 | 75.2 | 71.4 |
| 2.5 | 30 | 79.5 | 70.6 |
| 5 | 15 | 67.9 | 74.7 |
| 5 | 20 | 76.6 | 71.5 |
| 5 | 25 | 77.1 | 71.6 |
| 5 | 30 | 79.2 | 70.3 |

Figure 4:
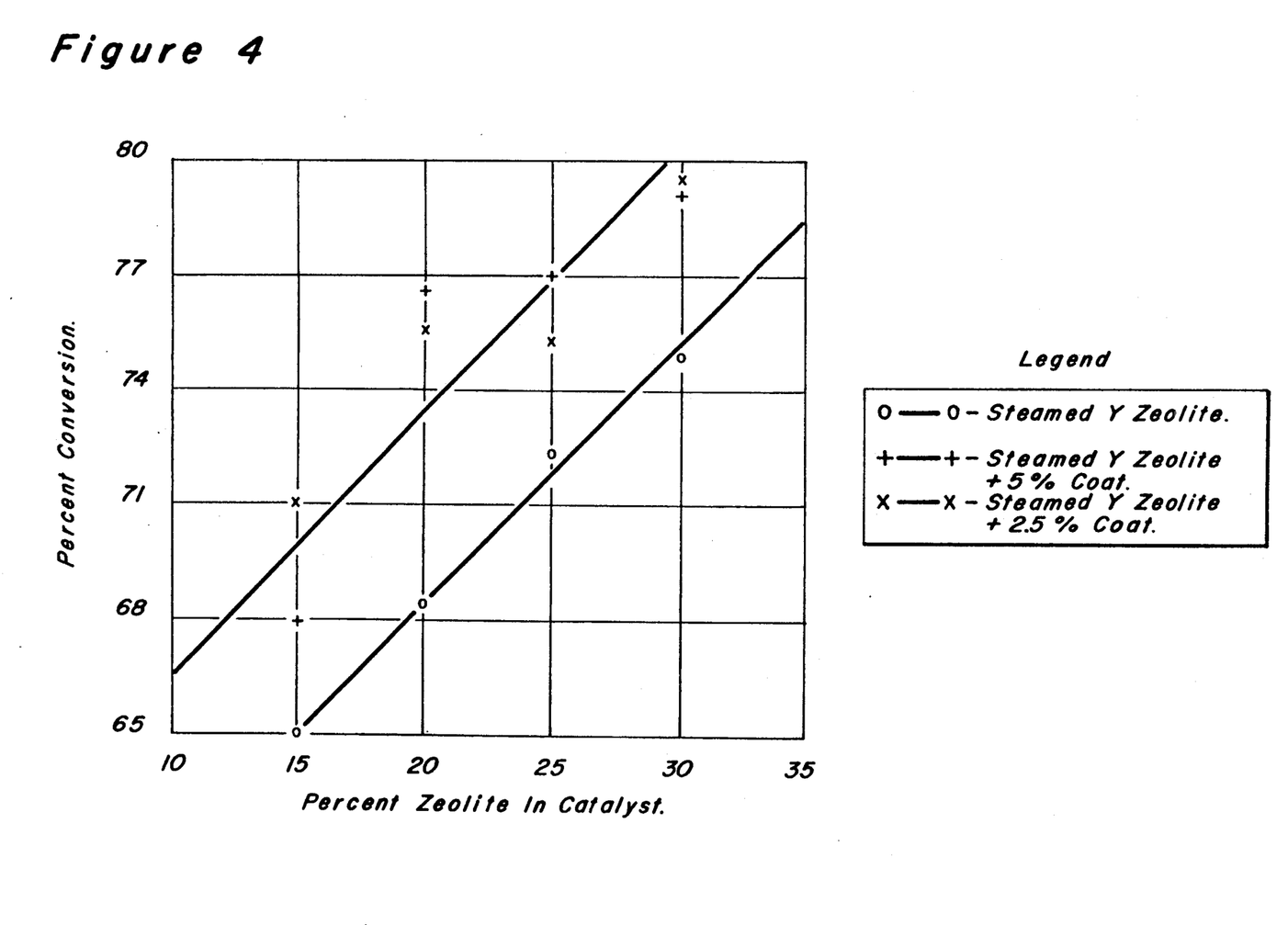
FIG. 4 shows the effect of polymer coating the sieve of Example 2 on its activity in FCC catalysts.
Figure 5:
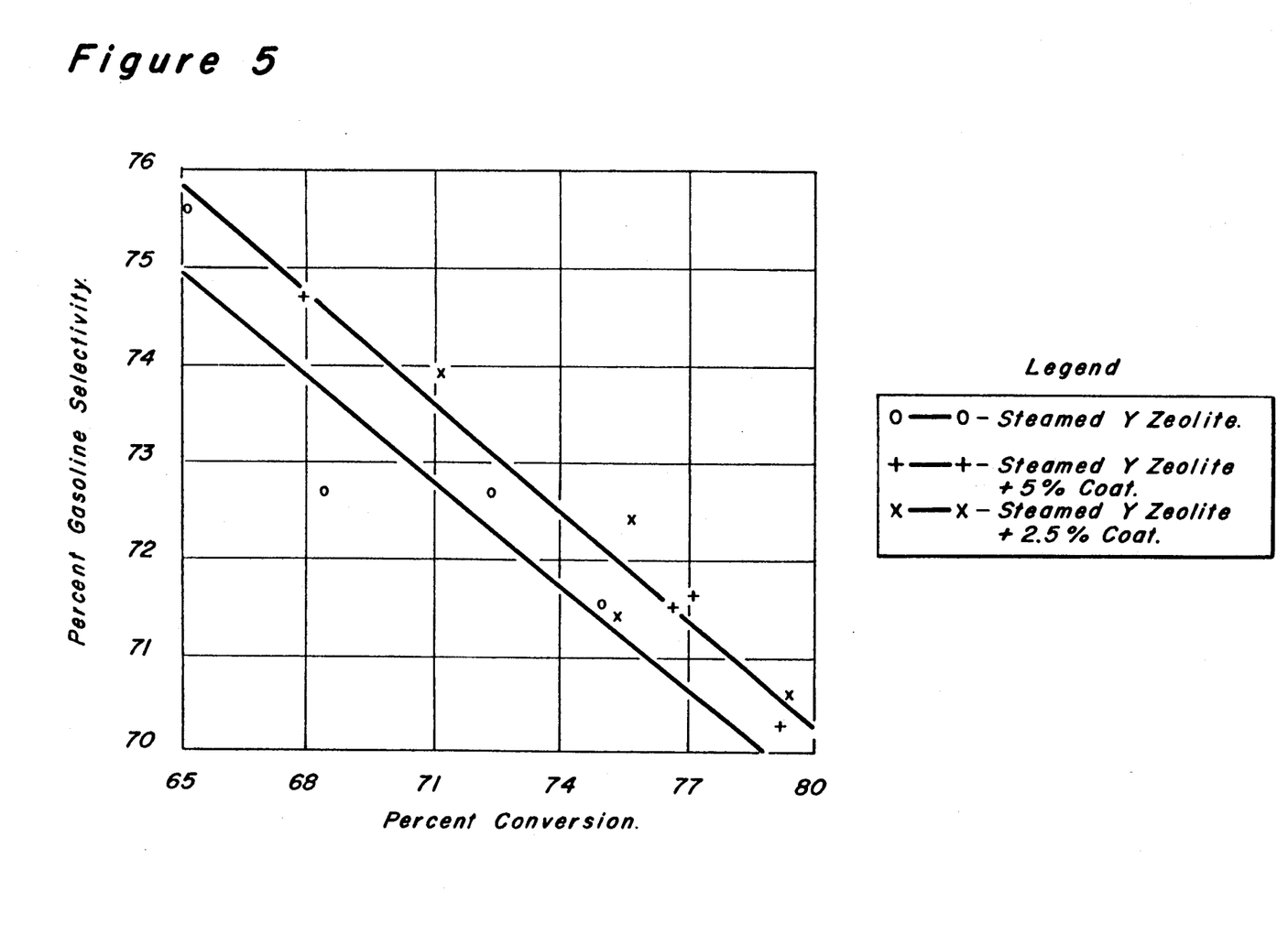
FIG. 5 shows the effect of polymer coating the sieve of Example 2 on its selectivity in FCC catalysts.

The results in Table 3 and in FIG. 4 clearly show that the catalyst prepared from the precoated zeolite are more active when compared at comparable zeolite contents. These results also show that at comparable conversion the catalysts prepared with the precoated zeolite are more selective for gasoline range products. Thus, precoating the zeolite to increase diffusivity at the zeolite-binder interface enhances activity for primary reactions by allowing more rapid access of feed into the sieve. Precoating also allows for more rapid egress of the primary gasoline product from the sieve as evidenced by the higher gasoline selectivity and by reduced secondary cracking reactions as would occur if the primary product suffered hindered diffusion on their egress from the active sites within the zeolite crystal.

What is claimed is:

1. In a hydrocarbon conversion process of catalytic cracking or catalytic dewaxing comprising contacting the hydrocarbon under hydrocarbon converting conditions with molecular sieve agglomerates to afford a hydroconverted product, the improvement comprising using molecular sieve agglomerates with improved transport properties prepared by the method comprising coating molecular sieve particles with an organic polymer, fixing the organic polymeric coating to the surface of the molecular sieve particles so as to produce a non-migratory coating thereon, binding the coated molecular sieve particles with a binding agent which is at least one inorganic oxide, forming the agglomerates of molecular sieve particles, and removing the organic polymeric coating by calcination.

2. The process of claim 1 where the hydrocarbon conversion process is catalytic cracking effected at a temperature between 850° and 1100° F., a pressure of 0–50 psig, and a liquid hourly space velocity of 0.5 up to about 10, and the molecular sieve is zeolite Y.

3. The process of claim 1 where the hydrocarbon conversion process is catalytic dewaxing performed under a total hydrogen pressure of between 15 and 3000 psig, a temperature between about 200 and about 475° C. and a liquid hourly space velocity between about 0.1 and about 20, and the molecular sieve is a silicoaluminophosphate.

4. The process of claim 3 where the molecular sieve agglomerates have deposited thereon at least one Group VIII metal.

5. The process of claim 4 where the molecular sieve agglomerates also have deposited thereon a compound of a metal selected from the group consisting of molybdenum, nickel, vanadium, and zinc.

* * * * *